United States Patent
Chen

(10) Patent No.: US 8,482,324 B2
(45) Date of Patent: Jul. 9, 2013

(54) CIRCUIT FOR CONTROLLING PSON SIGNAL

(75) Inventor: Qi-Jie Chen, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 991 days.

(21) Appl. No.: 12/537,658

(22) Filed: Aug. 7, 2009

(65) Prior Publication Data
US 2010/0301908 A1    Dec. 2, 2010

(30) Foreign Application Priority Data
Jun. 2, 2009   (CN) .......................... 2009 1 0302851

(51) Int. Cl.
*H03L 7/00* (2006.01)
(52) U.S. Cl.
USPC .......................................................... 327/143
(58) Field of Classification Search
None
See application file for complete search history.

(56) References Cited

U.S. PATENT DOCUMENTS
6,882,942 B1 * 4/2005 Duduman ....................... 702/60

* cited by examiner

*Primary Examiner* — Daniel Rojas
(74) *Attorney, Agent, or Firm* — Altis Law Group, Inc.

(57) ABSTRACT

A circuit includes an ATX power connector with a PSON pin, a time delay circuit, and a stabilizer circuit. The time delay circuit receives an input PSON# signal and then sends an output PSON# signal to the PSON pin of the power connector after a time delay has elapsed. The stabilizer circuit is coupled to the PSON pin of the power connector for stabilizing the output PSON# signal.

14 Claims, 2 Drawing Sheets

CIRCUIT FOR CONTROLLING PSON SIGNAL

BACKGROUND

1. Technical Field

The present disclosure relates to a circuit for delaying a PSON (Power Supply ON) signal.

2. Description of Related Art

The micro ATX and ATX specifications recommend a 24-pin main connector interface for power supply. This interface incorporates standard ±5V, ±12V, 3.3V, 5V standby, and soft-power signals. Proper implementation of PSON#, 5 VSB, and PW-OK is required for an ATX-compliant power supply.

PSON# is an active low TTL (Transistor-Transistor Logic) signal that turns on all of the main power rails including 3.3V, 5V, −5V, 12V, and −12V power rails. When this signal is held high by the PC board or left open-circuited, outputs of the power rails should not deliver current and should be held at a zero potential with respect to ground. Power should be delivered to the rails only if the PSON# signal is held at ground potential.

FIG. 1 shows a typical motherboard of a computer system including an ATX power connector mated with a corresponding connector of an ATX power supply, an ICH (I/O Controller Hub), and a Super I/O. During powering up the motherboard, the ICH receives a RSMRST# signal which indicates that the standby signal 5 VSB is OK. Then, the ICH is responsive to a PWRBTN# (Power Button) signal for turning on the power supply and sends a high level SLP_S3# signal to the Super I/O. After receiving the high level SLP_S3# signal, the Super I/O sends a low level PSON# signal to the PSON pin of the power connector to turn on all of the power rails of the power supply.

Sometimes, the power button is triggered repeatedly in a very short time interval, and the power rails of the power supply do not have time to power up/down fully, which may cause power up/down sequence failure.

Therefore, a circuit for delaying the PSON signal to prevent the above described power up/down failure is desired.

DETAILED DESCRIPTION OF THE EMBODIMENTS

Figure 1:
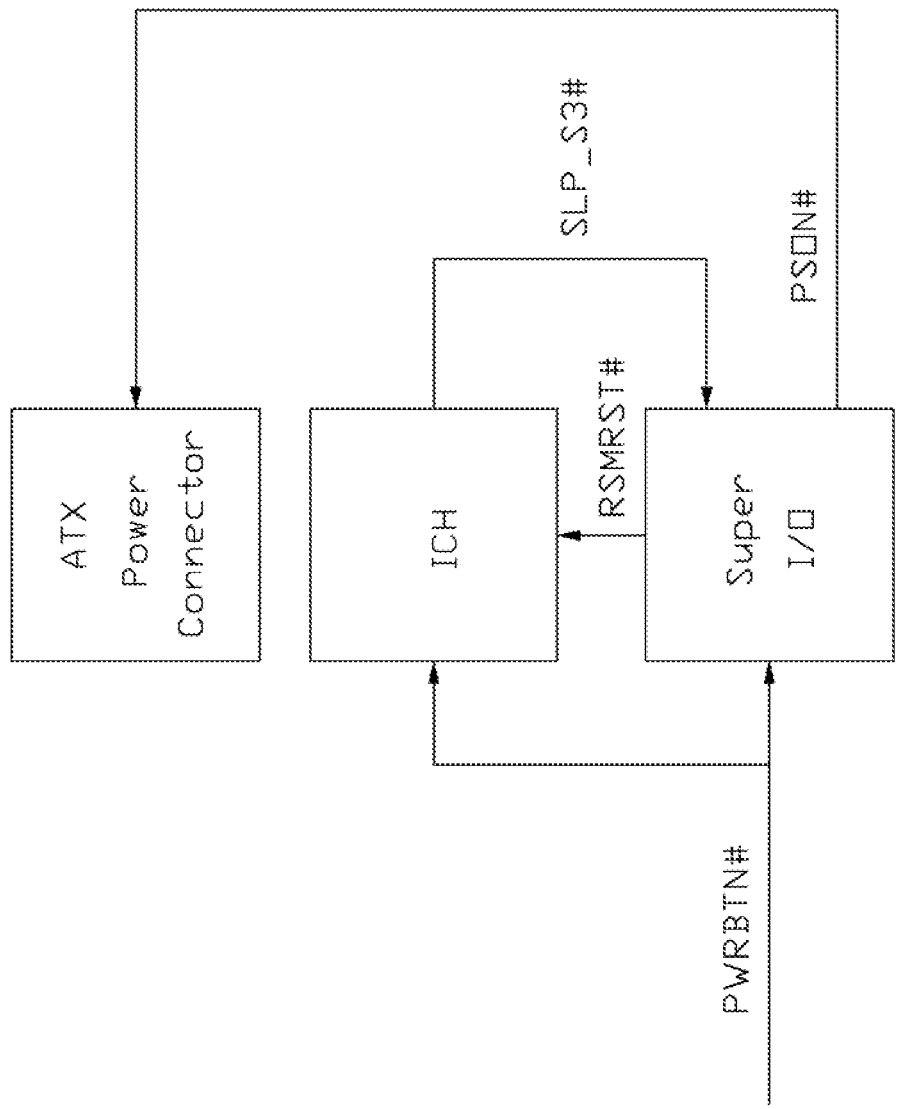
FIG. 1 illustrates a block diagram of a portion of a computer system according to the prior art.
Figure 2:
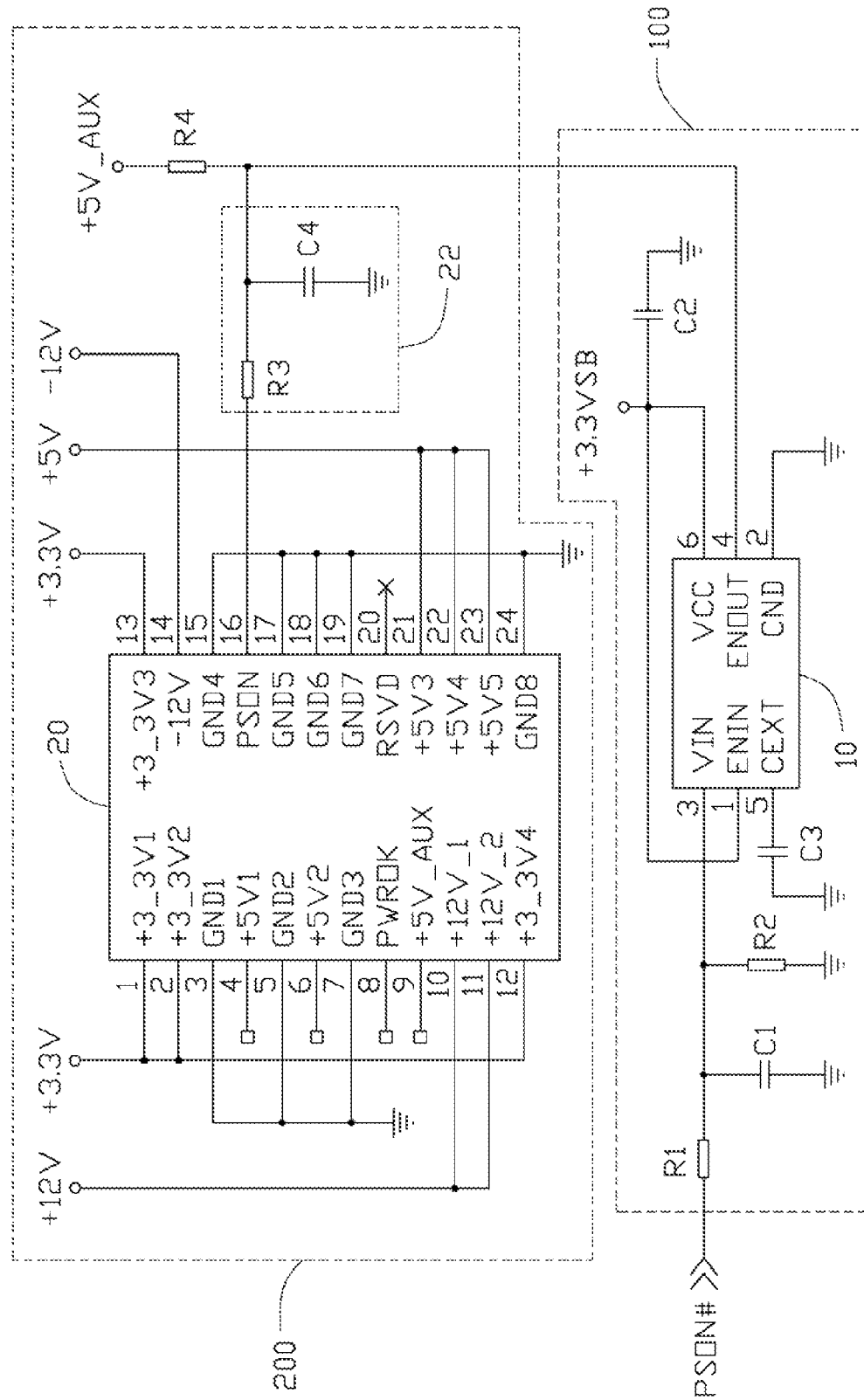
FIG. 2 illustrates an embodiment of a circuit for controlling a PSON signal.

Referring to FIG. 2, an embodiment of a circuit for controlling a PSON signal includes a time delay circuit 100 and a portion of a power supply circuit 200.

The power supply circuit 200 includes a 24-pin ATX power connector 20 mounted on the motherboard and mated with a corresponding connector of an ATX power supply. The power connector 20 has a PSON pin configured to receive PSON# signal from the motherboard and then turn on/off power rails (such as 3.3V, 5V, −5V, 12V, and −12V) of the power supply. A stabilizer circuit 22 has an output terminal coupled to the PSON pin of the power connector 20 for stabilizing the PSON# signal, and an input terminal of the stabilizer circuit 22 is coupled to a standby signal +5V_AUX and the time delay circuit 100. The stabilizer circuit 22 includes a resistor R3 and a capacitor C4. The resistor R3 is connected between the input terminal and the output terminal of the stabilizer circuit 22. The capacitor C4 is connected between the input terminal of the stabilizer circuit 22 and ground. The input terminal of the stabilizer circuit 22 is connected to the standby signal +5V_AUX via a resistor R4.

An input terminal of the time delay circuit 100 receives an input PSON# signal generated by a Super I/O of the motherboard. An output terminal of the time delay circuit 100 is connected to the PSON pin of the power connector 22 via the stabilizer circuit 22, and sends an output PSON# signal to the PSON pin of the power connector 22. There is a time delay between the input PSON# signal and the output PSON# signal.

The time delay circuit 100 includes a time delay chip 10 determining the time delay. Pin function descriptions of the time delay chip 10 are listed in the following table.

| Pin No. | Mnemonic | Description |
| --- | --- | --- |
| 1 | ENIN | Enable Input. Control the status of the enable out put. Active high for ADM1085/ADM1086. |
| 2 | GND | Ground. |
| 3 | VIN | Input for the Monitored Voltage Signal. Can previously monitor an analog power supply output signal and detect when it has powered up. |
| 4 | ENOUT | Enable output. Asserted when the voltage at VIN is above a threshold and the tie delay has elapsed, provided that the enable input is asserted. Active high for the ADM1085/ADM1086. |
| 5 | CEXT | External Capacitor Pin. The capacitance on this pin determines the time delay on the enable output. The delay is seen only when the voltage at VIN pass the threshold, and not when it falls below the threshold. |
| 6 | VCC | Power Supply |

In this embodiment, the time delay chip 10 is an ADM1085 or an ADM1086 chipset. A VIN pin of the time delay chip 10 receives the input PSON# signal via a resistor R1, and connects to ground via a capacitor C1 connected in parallel with a resistor R2. An ENIN pin and a VCC pin of the time delay chip 10 both connect to a +3.3 VSB signal. A GDN pin of the time delay chip 10 is connected to ground. A capacitor C2 is coupled between the +3.3 VSB signal and ground. A CEXT pin of the time delay chip 10 is connected to one end of a capacitor C3, and another end of the capacitor C3 is connected to ground. An ENOUT pin of the time delay chip 10 is connected to the input terminal of the stabilizer circuit 22 and then feeds the output POSN# signal to the PSON pin of the power connector 20.

A relationship between the capacitance "C" of the capacitor C3 and the time delay "t" is characterized by the following equation: $t=(C \times 4.8 \times 10^6)+35$ us. In this embodiment, a value of the capacitor C3 is 33 nF. The time delay increases a time that the output PSON# signal remains at a low level due to delay in arrival of the high level output PSON# signal. Thus, the power rails of the power supply have enough time to power up fully before the arrival of the high level PSON# signal which turns off the power rails. Therefore the computer system can be normally responsive to the power off (high level PSON# signal) signal and power down failure is prevented.

The time delay can also increase a time that the PSON# signal remains at a high level due to delayed arrival of the low level output PSON# signal. Thus, the power rails of the power supply have enough time to power down fully before the arrival of the low level PSON# signal which turns on the power rails. Therefore the computer system can be normally responsive to the power on (low level PSON# signal) signal and power up failure is prevented.

While the present disclosure has illustrated by the description preferred embodiments, and while the preferred embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

The invention claimed is:

1. A circuit comprising:
   an ATX power supply connector mounted on a motherboard and connected to an ATX power supply, the ATX power supply connector having a Power Supply On (PSON) pin;
   a Super I/O chip mounted on the motherboard capable of sending a PSON# signal to the PSON pin of the power supply connector to power on or off the ATX power supply; and
   a time delay circuit connected between the Super I/O chip and the power supply connector, the time delay circuit has an input terminal capable of receiving the PSON# signal from the Super I/O, and an output terminal capable of sending a delayed PSON# signal to the PSON pin of the power supply after a time delay has elapsed.

2. The circuit of claim 1, wherein the time delay circuit comprises a time delay chip, the time delay chip comprises an input pin connected to the PSON# signal and an enable output pin connected to the delayed PSON# signal, the enable output pin is active high.

3. The circuit of claim 2, wherein the time delay is capable of increasing the time the delayed POSN# signal retains at a low level thus ensuring the power rails of the power supply fully powering up until receiving a high level PSON# signal to power off the power rails.

4. The circuit of claim 2, wherein the time delay chip has an external capacitor pin connected to one end of a capacitor, another end of the capacitor connects to ground, and capacitance of the capacitor determines the time delay.

5. The circuit of claim 4, wherein a relationship between the capacitance "C" of the capacitor and the time delay "t" is characterized by the following equation:

$$t=(C\times 4.8\times 10^6)+35 \text{ us}.$$

6. The circuit of claim 5, wherein the capacitance of the capacitor is 33 nF.

7. The circuit of claim 2, wherein the time delay circuit further comprises an enable input pin fed with a standby signal, the enable input pin is active high and capable of controlling the status of the enable output.

8. A circuit comprising:
   an ATX power connector with a Power Supply On (PSON) pin;
   a time delay circuit capable of receiving an input PSON# signal from a motherboard and sending an output PSON# signal to the PSON pin of the ATX power connector after a time delay has elapsed; and
   a stabilizer circuit coupled between the PSON# pin of the ATX power connector and the output PSON# signal for stabilizing the output PSON# signal.

9. The circuit of claim 8, wherein the time delay is capable of increasing the time the output POSN# signal retains at a high level thus ensuring power rails of the power supply fully powering down until receiving a low level PSON# signal to power on the power rails.

10. The circuit of claim 8, wherein the time delay circuit comprises a time delay chip, the time delay chip comprises an input pin connected to the input PSON# signal, an enable output pin connected to the output PSON# signal, and an external capacitor pin connected a capacitor, and capacitance of the capacitor is capable of determining the time delay.

11. The circuit of claim 10, wherein the capacitance of the capacitor is 33 nF.

12. The circuit of claim 8, wherein the stabilizer circuit comprises a resistor and a capacitor coupled to a standby signal and the output PSON# signal.

13. The circuit of claim 12, wherein the resistor connects between an input terminal and an output terminal of the stabilizer circuit, the capacitor is connected between the input terminal of the stabilizer circuit and a ground terminal.

14. The circuit of claim 13, wherein the output terminal of the stabilizer circuit is connected to the PSON pin of the power connector, the input terminal of the stabilizer circuit is connected to the standby signal and the output PSON# signal.

* * * * *